(12) United States Patent
Mause et al.

(10) Patent No.: US 10,427,873 B1
(45) Date of Patent: Oct. 1, 2019

(54) CLUSTER-BASED-SYSTEM AND METHOD FOR E-COMMERCE-ORDER FULFILLMENT

(71) Applicants: Schaefer Systems International, Inc., Charlotte, NC (US); SSI Schäfer Automation GmbH (DE), Giebelstadt (DE)

(72) Inventors: Hartmut Mause, Williamston, SC (US); Patrick Englert, Wasserlosen (DE)

(73) Assignees: Schaefer Systems International, Inc., Charlotte, NC (US); SSI Schäfer Automation GmbH (DE), Giebelstadt (DE)

( * ) Notice: Subject to any disclaimer, the term of this patent is extended or adjusted under 35 U.S.C. 154(b) by 0 days.

(21) Appl. No.: 15/991,166

(22) Filed: May 29, 2018

(51) Int. Cl.
  *B65G 1/137* (2006.01)
  *G06Q 10/08* (2012.01)
(52) U.S. Cl.
  CPC ......... *B65G 1/1378* (2013.01); *B65G 1/1376* (2013.01); *G06Q 10/087* (2013.01)
(58) Field of Classification Search
  CPC ... B65G 1/1378; B65G 1/1376; G06Q 10/087
  See application file for complete search history.

(56) References Cited

U.S. PATENT DOCUMENTS

| | | | | |
|---|---|---|---|---|
| 4,303,503 A | * | 12/1981 | de Mimerand | B65G 47/61 198/367 |
| 7,928,336 B2 | * | 4/2011 | Stemmle | B07C 3/08 198/803.7 |

(Continued)

FOREIGN PATENT DOCUMENTS

| | | |
|---|---|---|
| DE | 10 2011 116 081 B3 | 4/2013 |
| JP | 2001 253515 A | 9/2001 |

(Continued)

OTHER PUBLICATIONS

European Search Report corresponding to European Patent Application No. 18174749.4-1017 dated Dec. 6, 2018.

*Primary Examiner* — Saul Rodriguez
*Assistant Examiner* — Ashley K Romano
(74) *Attorney, Agent, or Firm* — Renner, Otto, Boisselle & Sklar, LLP

(57) ABSTRACT

It is disclosed a system and method for order fulfillment, the method comprising the following steps: generating (S10) a packing pattern for the order defining the packing sequence; assigning (S12) one of the one or more merge-and-pack stations (22) to the order; analyzing (S14) the order with regard to pouchable and non-pouchable articles (46) associated with the order, wherein each of the pouchable articles (46) is sized and heavy such that it fits into one of the pouches (48), and wherein each of the non-pouchable articles (46) is at least one of sized and heavy such that it does not fit into one of the pouches (48); retrieving corresponding storage units (50), which contain the pouchable articles (46) associated with the order, from the warehouse (16), delivering the retrieved storage units (50) to one or more of the pick stations (18), and loading the pouchable articles (46) from the delivered storage units (50) into one or more of the pouches (48) at the one or more pick stations (18); transporting (S18) loaded pouches (48) from the one or more pick stations (18) to the assigned merge-and-pack station (22); transporting (S18) corresponding storage units, which contain the non-pouchable articles (46) associated with the order, to the assigned merge-and-pack station (22); and synchronizing arrivals (S20) of the loaded pouches (48) and the corresponding storage units (50), which contain the non-pouchable articles (46) associated with the order, and unloading the pouchable and non-pouchable articles (46) associated with the order at the assigned merge-and-pack (Continued)

station (16) so that the pouchable and non-pouchable articles associated with the order are transferable in the packing sequence to one or more shipping units associated with the order and the packing pattern.

16 Claims, 6 Drawing Sheets

(56) References Cited

U.S. PATENT DOCUMENTS

| | | | | |
|---|---|---|---|---|
| 8,490,774 | B2* | 7/2013 | Janzen | B65G 19/025 198/384 |
| 8,594,834 | B1* | 11/2013 | Clark | G06Q 10/087 700/214 |
| 8,718,814 | B1* | 5/2014 | Clark | G06Q 10/08 700/214 |
| 8,798,784 | B1* | 8/2014 | Clark | G06Q 10/08 198/431 |
| 8,892,240 | B1* | 11/2014 | Vliet | B65B 59/00 700/213 |
| 9,896,315 | B2* | 2/2018 | High | E01H 5/12 |
| 2005/0149226 | A1* | 7/2005 | Stevens | B65G 1/1371 700/214 |
| 2018/0025410 | A1 | 1/2018 | Kasper et al. | |

FOREIGN PATENT DOCUMENTS

| | | |
|---|---|---|
| JP | 2010143745 A | 7/2010 |
| WO | 2017/027897 A1 | 2/2017 |
| WO | 2017/214652 A1 | 12/2017 |

* cited by examiner

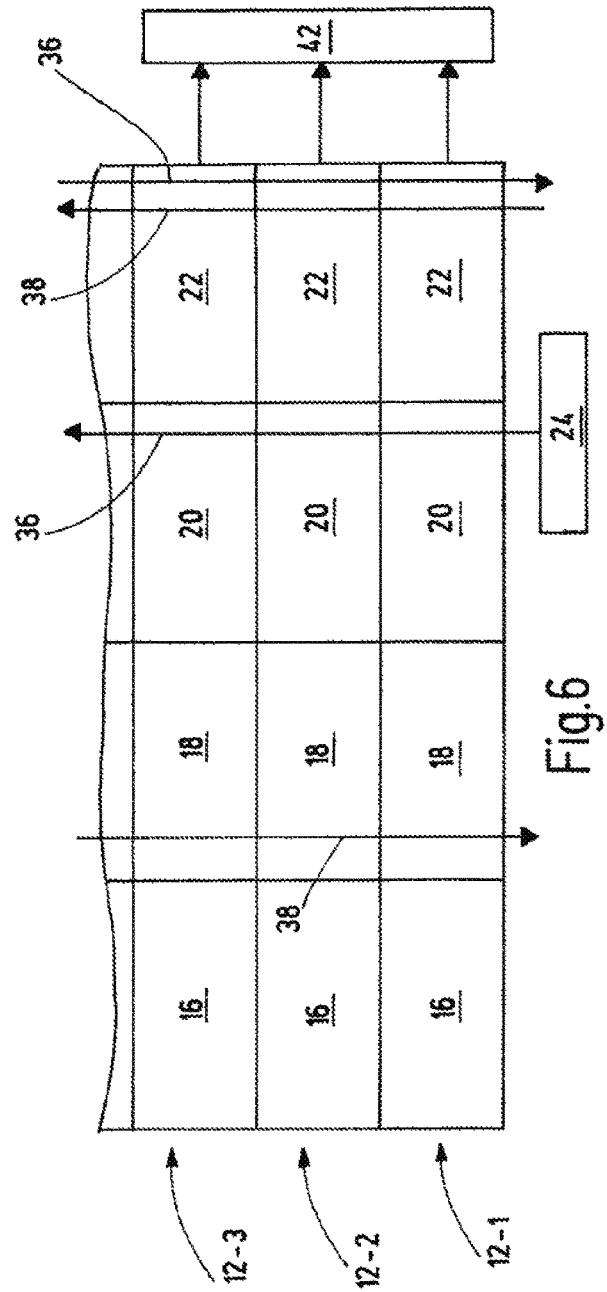

CLUSTER-BASED-SYSTEM AND METHOD FOR E-COMMERCE-ORDER FULFILLMENT

BACKGROUND OF THE INVENTION

The present invention relates to an article-handling system for order fulfillment, in particular for E-commerce order fulfillment. Further, the present invention relates to a method for operating a corresponding system. The present invention is suitable for picking pieces and/or cases.

RELATED PRIOR ART

Implementing E-commerce order fulfillment is difficult. Large volumes (1 million pieces or more per day) have to be handled, i.e. picked, packed, and shipped. Large numbers of SKUs (Stock Keeping Units) have to be handled.

Another problem is to be seen in the growing E-commerce market (place). Designing a corresponding article-handling system today may not meet the requirements of tomorrow. Therefore, a modular system is desirable. However, conventional systems are arranged in a decentralized manner. For example, a warehouse is positioned in the left corner of the overall system, wherein palletizing/depalletizing is positioned in the center. Dependent on the specific positioning of the conventional system components (such as picking area, warehouse pre-zone holding conveyors, and the like) extending the system might be difficult, if not impossible.

Due to this arrangement of the components conventional systems must not have one single point of failure. This means that, if one of the components fails, the entire system fails.

Further, the system should be capable of handling both pouchable articles and non-pouchable articles. Many know E-commerce systems work with pouches conveyed by an overhead conveyor. One of the main advantages of an overhead conveyor is to be seen in its sorting capabilities. Corresponding pouch and overhead system is described in WO 2013/053747 A1 which is incorporated by reference here.

SUMMARY OF THE INVENTION

Therefore, it is an object of the present invention to provide a system and method capable of meeting current and future E-commerce needs.

According to a first aspect an article-handling system for order fulfillment, in particular e-commerce-order fulfillment, is provided, which system comprises: one or more pick-and-pack clusters; an overhead conveyor system which includes a network of overhead conveyors, for conveying pouches, preferably of one standardized pouch type; a floor-bound conveyor system, which includes a network of floor-bound conveyors such as roller conveyors, belt conveyors, driverless transportation vehicles like AGVs (Automated Guided Vehicles), or the like, for conveying at least one of storage units, which may have different sizes, and pallets each holding (goods-receipt) articles; and a central control unit; wherein each of the one or more pick-and-pack clusters comprises the following modules: an automated warehouse, preferably a tote warehouse, comprising a plurality of racks and aisles therebetween, wherein the racks are configured to store and retrieve storage units, which are preferably loaded by articles of one (article) type only, optionally in a compartment-divided manner, by an automated storage and retrieval device such as a shuttle; a plurality of pick stations connected to floor-bound conveyor system for delivering the storage units from the warehouse, wherein each of the picking stations is configured for automatic or manual loading the (goods-receipt) articles, in accordance with an article type and number defined by an order, from the storage units into the pouches, preferably on a one-by-one basis and in particular in an article-orientated manner in case of batch-picking; and one or more merge-and-pack stations connected to the pick stations via the overhead conveyor system for delivery of loaded pouches, and connected to the warehouse via the floor-bound conveyor system for delivery of the storage units, wherein each of the merge-and-pack stations is configured to unload articles from the delivery storage units and the loaded pouches, and to transfer the unloaded articles in a packing sequence, which is preferably preset by a packing pattern determined by a packing algorithm, to one or more shipping load supports; wherein the control unit is configured to perform the following steps: generating a, preferably volume-optimized, packing pattern for the order, in particular in advance, which defines the packing sequence; assigning one of the one or more merge-and-pack stations to the order; analyzing the order with regard to pouchable and non-pouchable articles associated with the order, wherein each of the pouchable articles is sized and heavy such that it fits into one of the pouches, and wherein each of the non-pouchable articles is at least one of sized and heavy such it does not fit into one of the pouches; causing: i) retrieval of corresponding storage units, which contain the pouchable articles associated with the order, from the warehouse; ii) delivery of the retrieved storage units to one or more of the picking stations; and iii) loading the pouchable articles from the delivered storage units into one or more of the pouches at the one or more pick stations; causing transport of loaded pouches from the one or more pick stations to the assigned merge-and-pack station; causing, preferably in a buffer-free manner, transport of corresponding storage units, which contain the non-pouchable articles associated with the order, preferably either from the warehouse or a goods-receipt, to the assigned merge-and-pack station; and synchronizing arrivals of the loaded pouches and the corresponding pouches which contain the non-pouchable articles associated with the order and unloading the pouchable and non-pouchable articles associated with the order at the assigned merge-and-pack station so that the pouchable and non-pouchable articles associated with the order are transferable in the packing sequence to one or more shipping units (e.g., totes) associated with the order and the packing pattern.

The system is modular, and therefore arbitrarily scalable. In case of growing needs, the layout of the system can be scaled in at least two directions.

The modularity of the concept allows single points of failure without jamming the entire system. Single points of failure can be bypassed by using adjacent modules having the same functionality.

Each of the modules may work autonomously. Each of the modules can supply itself.

The system is capable of handling large item volumes such as one million articles or more per day. The system is capable of handling large numbers of articles such as one million or more per day.

The system is capable of handling pouchable and non-pouchable articles at the same time.

One particular advantage is to be seen in the synchronized arrival of the (automatically sortable) pouches holding pouchable articles and the storage units holding non-pouchable articles, each being associated with the order, at the assigned merge-and-pack station.

In a preferred embodiment each of the one or more pick-and-pack clusters further comprises the following module: one or more decant stations connected to the warehouse via the floor-bound conveyor system, wherein each of the decant stations is configured for decanting the (goods-receipt) articles into the storage units of the warehouse.

The system is capable of handling (goods-receipt) articles of any type. The system is independent from the way the (goods-receipt) articles are delivered and received. The (goods-receipt) articles may be supplied with load supports, or without load supports. For example, the (goods-receipt) articles may be delivered in cartons placed on a pallet. However, the system is also capable of handling cartons (containing the goods-receipt articles inside) without any load support.

At the decant stations the (goods-receipt) articles are decanted into storage units dedicated to the warehouse(s). This means, for example, that the storage units are configured for storage and retrieval in the warehouse(s), preferably by automated storage and retrieval devices such as cranes, and shuttles. Further, the storage units are configured for being transported via conventional (steady) conveyors such as roller conveyors, chain conveyors, belt conveyors, and the like.

The decant stations can also be used for compacting the articles (already stored) within the warehouse. For example, if a specific article type is distributed over several storage units in the warehouse, the corresponding storage units might be transported to the decant station for emptying at least one of these storage units, and for compacting the corresponding article type in another one of these storage units.

In a preferred embodiment the modules of each of the pick-and-pack clusters are respectively arranged, in a layout view, along a first imaginary, preferably straight, line in an order of: the warehouse; the pick stations; the decant stations; and the merge-and-pack stations.

A layout view is exemplarily shown in FIGS. 1, 3 and 4. The layout view represents a top view of the system.

By arranging the specific cluster modules in the above-mentioned sequence (i.e. geometrical order), customers' orders can be processed from one side of the overall system to the other side thereof. The system is easily scalable.

Further, identical modules of different ones of the pick-and-pack clusters are arranged directly adjacent to each other along a second imaginary, preferably straight, line perpendicular to the first imaginary line.

This again expresses the scalability of the present concept.

According to another preferred embodiment the step of synchronizing arrivals includes selecting a, preferably path-optimized (such as the shortest or fastest), conveying path for the non-pouchable articles associated with the order from the warehouse to the assigned merge-and-pack station, and adjusting the transport of the pouchable articles associated with the order temporally.

The (conveying) path of the non-pouchable article(s) through the system, even if several clusters are traversed, is selected and adapted to the conveying path (including sorting processes, if necessary) of the pouchable articles, which are transported (and sorted/sequenced) by means of the overhead conveyor system.

Often, a non-pouchable article type is present at several warehouse storage locations. Therefore, it makes a difference which one of a plurality of possible warehouse-storage locations is selected as a source for the specific non-pouchable article type required for fulfilling the associated order. Dependent on the selection of the specific warehouse-storage location the conveying path is either longer or shorter. Consequently, more or less time remains for providing the pouchable articles being associated with the same order in due time at the assigned merge-and-pack station.

Preferably, one of a warehouse-storage location of the non-pouchable article(s) associated with the order and the assigned merge-and-pack station is selected first.

The length of the conveying path also depends on the destination (i.e. the assigned merge-and-pack station) to which the non-pouchable article is to be transported. Therefore, also the selection of the assigned merge-and-pack station affects the length of the conveying path, as well as the conveyance duration.

In particular, the control unit is further configured to: analyze the order with regard to non-toteable articles, wherein each of the non-toteable articles is at least one of sized and heavy such that it does not fit into one of the storage units and the pouches; cause transport of the non-toteable articles associated with the order to the assigned merge-and-pack station; and synchronize arrivals of the pouchable, non-pouchable, and non-toteable articles at the assigned merge-and-pack station according to the packing sequence.

Non-toteable articles are articles which neither fit into one of the storage units or one of the pouches. These kinds of articles are typically called "bulky articles". One possible example of a non-toteable article might be an umbrella or a refrigerator.

However, in this case the present system is capable of handling even three different article-type categories, namely non-toteable articles, non-pouchable articles, and pouchable articles.

In another embodiment the overhead conveyor system further comprises a sorter arranged downstream to the pick station and upstream to the assigned merge-and-pack station.

A sorter is a device which is capable of i.) buffering a plurality of pouches. Conventional sorters may buffer up to several thousands of pouches at the same time. Further, sorters are capable of ii.) bringing the pouches into a desired (absolute) sequence, although the pouches are fed chaotically into the sorter.

The more pouches are buffered in the sorter the more time is usually required to bring the pouches of the buffer into a desired sequence at an outlet of the buffer.

The sorter enables two-stage picking processes (i.e. batch picking). In the two-stage picking process, a larger number of orders are grouped according to common article types included in these orders. In the first stage the articles of a specifically required article type are retrieved from the warehouse and loaded, preferably on a one-by-one basis, into the pouches. Hence, the loading process is conducted in an article-orientated manner. In the second stage, the loaded pouches, which have been loaded with each of the article types required for the group of orders, are sorted in accordance with the respective orders belonging to the batch (i.e. the group). This process is order-orientated. The second stage is implemented by the sorter.

An exemplary sorter is disclosed in U.S. Pat. No. 9,014,843 which is incorporated by reference here. This document mentions further sorter types which could be used as well in the present concept.

Preferably, the floor-bound conveyor system is free of buffers between the warehouse and the assigned merge-and-pack station.

"Free of buffers" does not mean that no sequencing means may be provided between the warehouse and the assigned merge-and-pack station. This sequencing means may be implemented by a bypass line allowing arranging the storage units according to a desired sequence. However, the storage units are not buffered, i.e. temporarily stored.

In another embodiment the system is configured to handle more than one million of different article types, wherein 90% preferably are slow movers.

An article assortment can be classified according to an ABC distribution. Slow movers are normally categorized as articles of type C. Slow movers do not have a high access frequency, i.e. they are not required as often as articles of the types A or B. Articles of the type A are so-called fast movers, wherein articles of the type B are so-called intermediate movers.

Preferably, the pouchable articles are respectively defined by a maximum size of 600×500×200 $mm^3$, in particular the pouchable articles respectively a maximum weight of 8 kg.

The size and weight is substantially determined by the capacity of the pouches. The pouches define the maximum size and maximum weight. Also, the pouch system itself might be restricting. As greater and heavier to pouches are as slower is system (e.g. in terms of throughput).

If a plurality of different pouch types is used, there might be different categories of pouchable article (types). Preferably one standardized pouch type is used.

In another embodiment the control unit is further configured to perform batch-picking (i.e. a two-stage picking process) so that the pouchable articles associated with a plurality of orders are loaded in an article-orientated manner at the picking stations.

For example, an article-orientated loading process for filling the pouches receivable (with regard to capacity) by a sorter takes one hour. Then, the sorter is filled with up to several thousands of pouches, wherein each of the pouches preferably is loaded with one article (type) only. Normally, a sequencing process for bringing, for example, 216 pouches into a desired sequence takes 15 minutes. These 216 pouches normally correspond to 70 to 100 orders. If some of the 70 to 100 orders contain non-pouchable articles, the 15 minutes are sufficient for retrieving the corresponding non-pouchable articles from the warehouse, and transporting the same to the assigned merge-and-pack station.

No buffers are required for the non-pouchable articles. The non-pouchable articles are delivered directly from the warehouse to the assigned merge-and-pack station. With other words, the warehouse is its own buffer.

In another particular embodiment the non-pouchable articles associated with the plurality of orders are transported from warehouses of clusters different to the cluster of the assigned merge-and-pack station.

Further, according to another aspect it is disclosed a method for operating an article-handling for (e-commerce-) order fulfillment, the system comprising: one or more pick-and-pack clusters; an overhead conveyor system, which includes a network of overhead conveyors, for conveying pouches; a floor-bound conveyor system, which includes a network of floor-bound conveyors, for conveying at least one of storage units and pallets each holding (goods-receipt) articles; and a central control unit; wherein each of the one or more pick-and-pack clusters comprises the following modules: an automated warehouse comprising a plurality of racks and aisles therebetween, wherein the racks are configured for storage and retrieval of storage units by an automated storage and retrieval device; a plurality of pick stations connected to the warehouse via the floor-bound conveyor system for delivering the storage units from the warehouse, wherein each of the pick stations is configured for loading the (goods-receipt) articles, in accordance with an article type and number set by an order, from the storage units into the pouches; and one or more merge-and-pack stations connected to the pick stations via the overhead conveyor system for delivery of loaded pouches, and connected to the warehouse via the floor-bound conveyor system for delivery of the storage units, wherein each of the merge-and-pack stations is configured to unload articles from the delivered storage units and the loaded pouches, and to transfer the unloaded articles in a packing sequence to one or more shipping units; the method comprising the following steps: generating a packing pattern for the order defining the packing sequence; assigning one of the one or more merge-and-pack stations to the order; analyzing the order with regard to pouchable and non-pouchable articles associated with the order, wherein each of the pouchable articles is sized and heavy such that it fits into one of the pouches, and wherein each of the non-pouchable articles is at least one of sized and heavy such that it does not fit into one of the pouches; retrieving corresponding storage units, which contain the pouchable articles associated with the order, from the warehouse, delivering the retrieved storage units to one or more of the pick stations, and loading the pouchable articles from the delivered storage units into one or more of the pouches at the one or more pick stations; transporting loaded pouches from the one or more pick stations to the assigned merge-and-pack station; transporting the corresponding storage units, which contain the non-pouchable articles associated with the order, to the assigned merge-and-pack station; and synchronizing arrivals of the loaded pouches and the corresponding storage units, which contain the non-pouchable articles associated with the order, and unloading the pouchable and non-pouchable articles associated with the order at the assigned merge-and-pack station so that the pouchable and non-pouchable articles associated with the order are transferable in the packing sequence to one or more shipping units associated with the order and the packing pattern.

BRIEF DESCRIPTION OF THE DRAWINGS

It is to be understood that the features mentioned before and to be explained hereinafter cannot only be used in the respective combinations mentioned before, but also in other combinations or in isolation without leaving the scope of the present invention.

Illustrative embodiments of the invention are shown in the drawings and will be explained in more detail in the following.

FIG. 5 shows a block diagram of one pick-and-pack cluster.

FIG. 6 shows a block diagram of several pick-and-pack clusters.

PREFERRED EMBODIMENTS OF THE INVENTION

Figure 1:
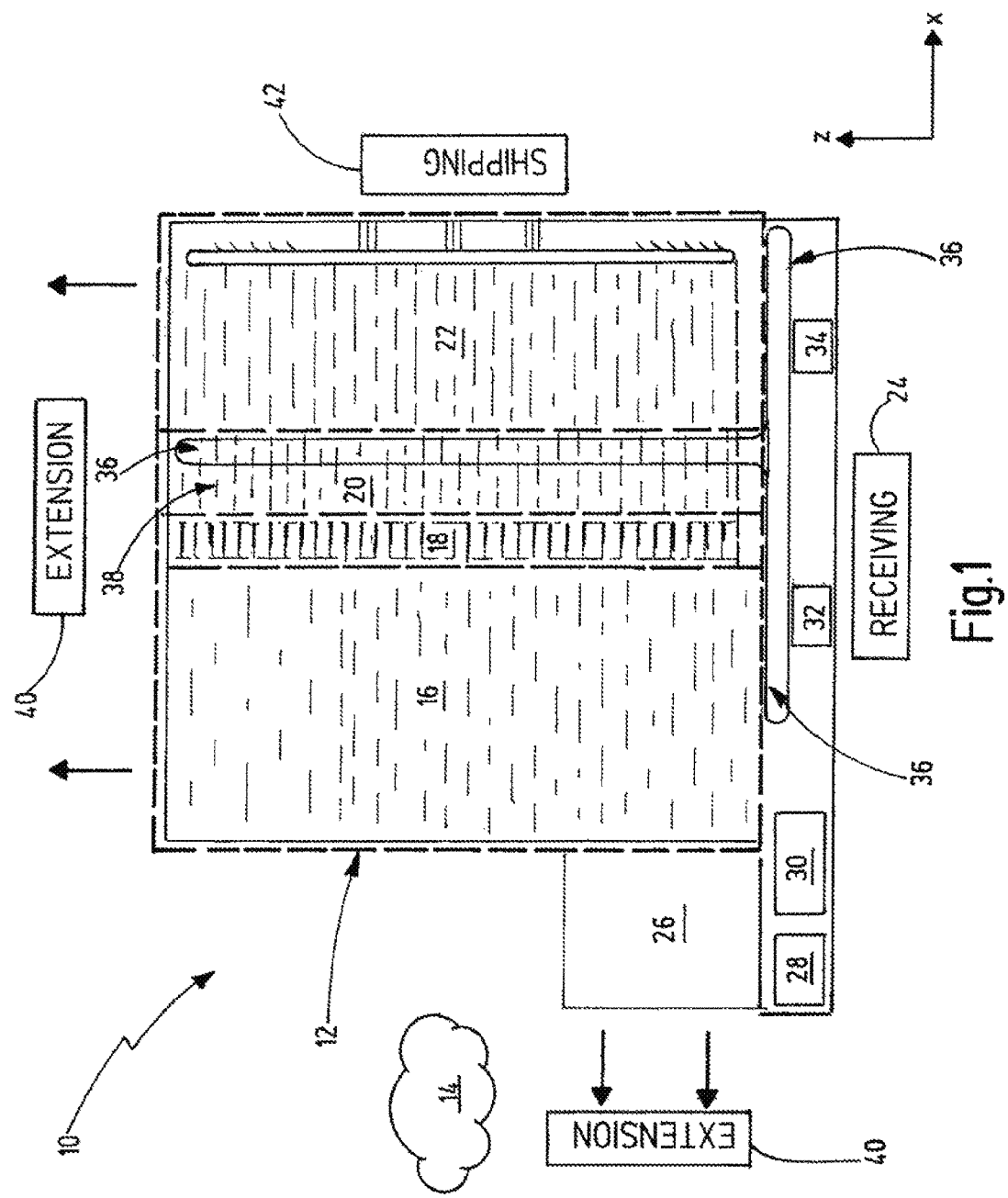
FIG. 1 shows a basic layout (top view) of an article-handling system.

If vertical and horizontal, or left and right, orientations are mentioned in the following it is clear that these orientations can be exchanged with each other due to rotation, and therefore are not limiting. As usual in the field of (intra) logistics, in storage and order-picking systems (such as distribution centers, material/article-handling systems in general, etc.) a longitudinal direction is designated by "X", a transversal direction is designated by "Z", and a height direction is designated by "Y". The directions X, Y, and Z preferably define a Cartesian coordinate system.

In the following an "article" is to be understood as a handling unit used throughout the system, and in particular in goods-receipt areas and storage areas (such as rack warehouses, ground warehouses, flow-channel warehouse, etc.). Articles are distinguished by (article) types. The articles can be provided (and delivered) on load supports such as pallets, boxes, containers, buckets, cartons, trays, (overhead) pouches, and the like. However, the articles can also be provided without load supports. The articles can be "piece goods" or "cases", wherein one case normally consists of a plurality of piece goods packed together to form one handling single unit such as a SKU. The article is a (smallest) unit of an article assortment.

In the following the terms "article", "case", "good", and "piece good" will be used equivalently.

A "picking order" (or a so-called "order") is typically represented by a set of data. Each order consists of one or more order lines, wherein each of the order lines represents a number of ordered articles of different article types. For example, one order may consist of one music CD (order line #1, one piece, pouchable), two toothbrushes (order line #2, two pieces, pouchable), and one microwave (order line #3, one piece, non-pouchable). Orders may differ in the number of order lines, and the order lines may differ in the number of pieces.

In terms of data, each order usually comprises a header, an (optional) priority field, and/or an article field. The header field may comprise information about one or more of: the customer who has deposited the order; a customer address; and a customer identifier; as well as an order number. The priority field includes information on whether the order is normal or urgent. Urgent orders are orders having high (processing) priority which are handled typically prior to the normal orders.

A "warehouse" may be represented by a rack arrangement such as a rack warehouse. A warehouse typically includes a plurality of racks. Rack aisles are defined between the racks, wherein the aisles typically extend in the longitudinal direction X of the racks and serve as an operating space for manipulators (such as humans or robots), driverless transport vehicles (such as AGVs, and the like) and/or storage and retrieval devices (such as cranes, shuttles, etc.). Each rack ends at its opposing (shorter) front faces which are orientated in a plane perpendicular to the longitudinal direction of the aisle. Each of the racks comprises a plurality of (rack) storage locations (e.g., rack compartments, segment of a flow channel etc.). Typical rack warehouse are disclosed in U.S. Pat. No. 8,827,619 B2, and US 2017/0152106 A1 which are incorporated by reference herewith.

Further, the present invention is operated substantially in accordance with the principle "goods-to-man". If machines such as robots are simultaneously used with humans, this principle may also be called "goods-to-manipulator principle".

In general, different picking strategies may be applied. Typical picking strategies are: order-orientated picking, and article-orientated picking. "Picking" is to be understood as the removal of one or more articles from a storage unit (such as a tote, a pallet, a tray, or the like) and the delivery, or deposition, of the removed one or more articles in a collecting/shipping unit (such as a tray, a tote, a pouch, or the like).

In case of an order-related picking process the corresponding order is processed in its entirety, i.e. each item (i.e. article) of the (associated) order is collected serially and/or in parallel (by means of order splitting).

The picking process can depend on many factors. One factor which definitely is relevant is an average order structure. It makes a difference whether different articles are to be picked by little numbers or whether the same (type of) articles are to be picked again and again by high numbers. It makes a further difference whether one order comprises many or only a few order lines. These differences express in the "average order structure". For example, in E-commerce the average order structure is about 1.5 (single piece) order lines per order.

A "batch" is a synthesis of several orders to form one processing lot. A "batch" may also represent a syntheses of several (picking) orders to form one order quantity, or list of orders. During batch operation the articles of the processing lot are first collected (and removed) in an article-orientated manner, and then sorted (i.e. distributed) in an order-orientated manner. The present concept may heavily rely on batch operation.

A coordination of the processing of the orders, in terms of data, is handled by a so-called order-handling system most times being integrated into a picking control system, which in turn can comprise an enterprise resource planning system.

The picking control system can further have integrated a (storage) location administration system. The picking control system is typically realized by a data-processing system, which preferably operates in an online mode for data transmission and data processing in a free of delay manner. The picking control system can be implemented by one or more controlling units.

The control unit of the present concept may include a corresponding picking control system, as well as any other system mentioned above such as the order-handling system, and/or an enterprise resource planning system.

The present invention is suitable for both "case picking" and "piece picking".

With both types of picking the manipulators (human and/or robots) pick the articles. But the manipulators may also conduct replenishment and storing processes. In the following, picking processes will be discussed only. However, it is clear that the following description is also applicable to replenishment/storing processes.

FIG. 1 shows a basic layout (i.e. top view) of an article-handling system 10 of the present invention. The system 10 comprises one or more pick-and-pack clusters 12. FIG. 1 exemplarily shows only one pick-and-pack cluster 12 which extends, for example, along the longitudinal direction X.

The system 10 further comprises a control unit 14 which may comprise one or more of the above-mentioned data-processing systems.

Each pick-and-pack cluster 12 comprises: a warehouse 16; at least one picking station 18; at least one decant station 20 (optionally); and at least one merge-and-pack station 22.

FIG. 1 exemplarily shows plurality of picking stations 18, plurality of decant station 20, and plurality of merge-and pack stations 22. Preferably, the warehouse 16, the picking stations 18, the decant stations 20, and the merge-and pack stations 22 are arranged (in particular in this specific order), for example, along the longitudinal direction X. It is clear that they may be arranged along one of the directions Z and Y instead.

The warehouse 16 is preferably (fully) automated, and configured for storage and retrieval of storage units. In the following the storage units will be implemented exemplarily by totes. Therefore, the use of totes is not to be understood in a limiting manner. A "tote" may be a transport box which can be handled by machines and is conveyable. With other words, in particular, the warehouse 16 is a tote warehouse. However, other storage units than totes might be used instead such as pallets, trays, cartons, and the like.

The warehouse 16 comprises a plurality of racks (not shown) and rack aisles (not shown) between the racks. The racks are configured for storage and retrieval of storage units, i.e totes, 50 (not shown here, cf. FIG. 2). Storage and retrieval of the totes 50 is preferably performed by automated storage and retrieval devices (not shown) such as cranes, shuttles, and the like.

Each of the totes 50 stored in the warehouse 16 preferably is loaded in an article-pure manner. This means that articles 46 of one article type are loaded, i.e. stored, in the respective tote 50 only.

However, it is also possible that different types of articles 46 are contained in one and the same tote 50. In this case the tote 50 may have a plurality of compartments (not shown) divided by separating walls (not shown) so that this tote 50 actually consists of a plurality of "smaller" totes being arranged within the one bigger tote 50.

Figure 2:
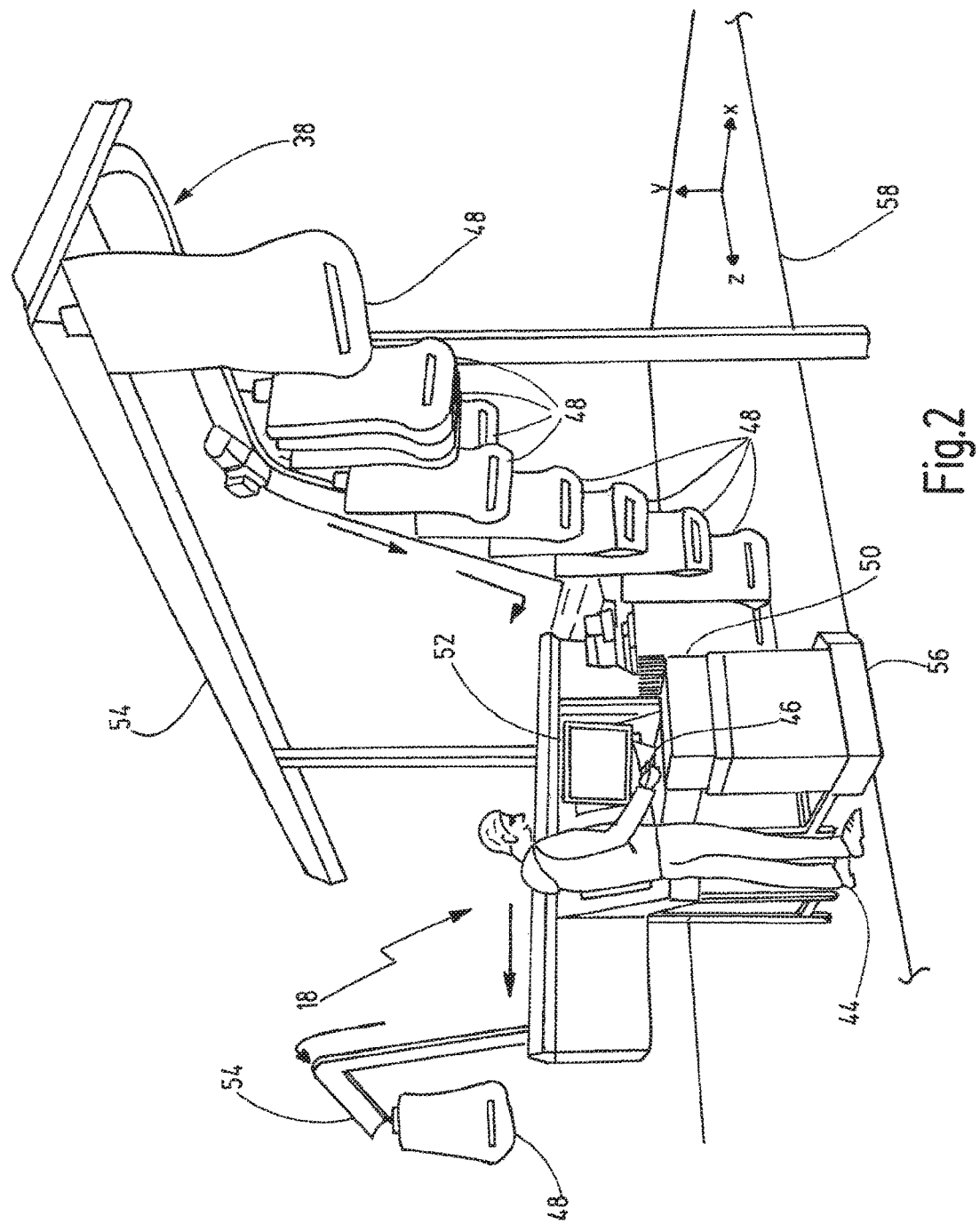
FIG. 2 shows a perspective view of an exemplary pouch-filling station.

The picking stations 18 can be operated by robots (not shown), humans 44, or robots and humans 44, see FIG. 2. At the picking stations 18 the articles 46 are removed from the totes 50 which have been delivered from the warehouse 16. The removed articles 46 are put into pouches 48 of an overhead conveyor 38, as will be explained in more detail below. After removal of the articles 46 from the totes 50, the corresponding totes 50 are either transported back into the warehouse 16 or to one of the decant stations 20 for replenishment or consolidation.

Returning to FIG. 1 also the decant stations 20 can be operated by robots, humans 44, or robots and humans 44. At the decant stations 20 (goods-receipt) articles 46 are decanted into the totes 50 for being stored in the warehouse 16. The (goods-receipt) articles 46 may originate from a (goods-) receiving area 24, as will be explained in more detail below.

Even further, the merge-and pack stations 22 may be operated by robots, humans 44, or robots and humans 44. At the merge-and pack stations 22 the pouches 48 and totes 50 are merged, i.e. brought together in terms of material flow, preferably in an order-orientated manner, for providing the articles 46 being associated with the corresponding order which has triggered the corresponding material/article flow in a packing sequence (i.e. an absolute sequence), as will be explained below in more detail.

In general, the system 10 may optionally comprise a pallet warehouse 26, e.g. a high-bay warehouse, for buffering the (goods-receipt) articles 46 delivered to the receiving area 24, for example, on pallets (not shown). A full-pallet receiving area 28 may be located adjacent to the pallet warehouse 26.

Further, in FIG. 1 an optional palletizing/depalletizing station 30 may be provided adjacent to the pallet warehouse 26. The palletizing/depalletizing station 30 may comprise one or more palletizing/depalletizing robots (not shown) known in the art.

The system 10 may further comprise an (optional) manual palletizing/depalletizing station 32, and an (optional) floor-loaded receiving station 34. The floor-loaded receiving station 34 is configured for handling the (goods-receipt) articles 46 arriving without load supports such as item being stacked directly on the bottom of a sea freight container.

The manual palletizing/depalletizing station 32, the floor-loaded receiving station 34, and the receiving area 24 may be coupled to a floor-bound conveyor system 36 including a network of floor-bound conveyors such as roller conveyors, belt conveyors, chain conveyors, and the like, but also AGVs.

The floor-bound conveyor system 36 is configured for conveying the articles 46 (with or without load supports) between the (goods-) receiving area 24, the warehouse 16, the decant stations 20, and the merge-and pack stations 22. In particular, the conveyor system 36 connects the warehouse 16, the picking stations 18, the decant stations 20, and the merge-and pack stations 22 in terms of an article flow (i.e. material flow).

The conveyor system 36 is "floor bound", i.e. the articles 46 are transported on the ground of a facility holding the system 10. Floor bound conveyors may be stationary conveyors, or dynamic/moving conveyors such as vehicles. Stationary conveyors may include a frame so that a conveying surface might be higher than the ground floor of the building.

The conveyor system 36 is formed of a network of floor-bound conveyors so that the totes 50 can reach each of the above-mentioned modules of the system 10, such as the warehouse 16, the picking stations 18, the decant stations 20, and the merge-and pack stations 22, along a plurality of different (shorter or longer conveying) paths. The network offers the opportunity to connect one source (e.g. the warehouse 16) and one destination (e.g. one of the stations 22) in many different ways.

The system 10 further includes an overhead conveyor system 38. The overhead conveyor system 38 is formed by a network of overhead conveyors for conveying the pouches 48 in a hanging manner (e.g., below a ceiling of the building, not shown). Preferably, the pouches 48 are of one standardized pouch type (with regard to size and capacity). Each pouch 48 represents a conveying unit capable of hanging below an endless circulating traction means of the overhead conveyor such as a link chain.

The overhead conveying system 38 substantially connects, in terms of material flow, the picking stations 18 to the merge-end-pack stations 22.

The floor-bound conveyor system 36 and the overhead conveyor system 38 do not collide with each other since they are provided at different heights in the direction Y.

FIG. 1 further shows two exemplary extension areas 40. It is clear that one or more extension areas 40 can be provided for the system 10. A first extension area 40 extends in the longitudinal direction X adjacent to the pallet warehouse 26. This first extension area 40 might also extend in the longitudinal direction X adjacent to the warehouse 16 (which is not explicitly shown in FIG. 1).

The first extension area 40 may be provided for receiving further long-term warehouses, such as the pallet warehouse 26, acting as a buffer for the warehouse(s) 16 of the cluster(s) 12.

A second extension area 40 may extend in the transversal direction Z, e.g., adjacent to the pick-and-pack cluster 12 shown in FIG. 1. This second extension area 40 may be provided for receiving additional pick-and-pack clusters 12 (not shown) for scaling the layout shown in FIG. 1 in the direction Z.

Even further, a shipping area 42 is shown in FIG. 1. The shipping area 42 may be arranged (directly) adjacent to the pick-and-pack cluster 12 in the longitudinal direction X, and is scalable, for example, in the transversal direction Z in case a plurality of the pick-and-pack clusters 12 are provided (along the transversal direction Z).

FIG. 2 shows a perspective view of one exemplary pick station 18 which may be used in the system 10 of FIG. 1.

The pick station 18 of FIG. 2 is operated manually by one or more humans 44. It is clear that the pick station 18 of FIG. 2 can be also operated in an automated manner such as by a robot (not shown). Further, some of the pick stations 18 of FIG. 1 might be operated by humans 44, wherein others are operated by the robots.

In FIG. 2 the human 44 picks (goods-receipt) articles 46 from a tote 50 into pouches 48, each already described above. The human 44 removes the articles 46 from the tote 50, and delivers the removed articles 46 into one or more of the pouches 48. This means the human 44 picks the articles 46.

The human 44 may receive corresponding picking instructions visually from the control unit 14, for example, via a computer screen 52. It is clear that these instructions can also be provided differently. For example, these instructions might be provided by voice and/or light.

With other words, the control unit 14 causes: i.) retrieval of corresponding totes 50, which contain the pouchable articles 46 associated with the order, from the warehouse 16; ii.) delivery of the retrieved totes 50 to the pick station 18; and iii.) loading, for example by way of instructing the human 44 or a robot (not shown), the pouchable articles 46 from the delivered totes 50 into one or more of the pouches 48 at the pick station 18.

Preferably, each of the pouches 48 always receives one of the articles 46 only, even in cases when an associated order line actually requires two or more pieces of the corresponding article type.

FIG. 2 shows the pick station 18 in an isolated manner, wherein the overhead conveyor system 38 and the floor-bound conveyor system 36 are partially shown.

The overhead conveyor system 38 may comprise a plurality of rails arranged near a ceiling of the building holding the system 10.

The floor-bound conveyor system 36 is exemplarily implemented by an AGV system, wherein one AGV 56 is explicitly shown for delivering one or more of the totes 50. The AGV 56 travels along (e.g. optically trackable) guiding lines 58 defining part of the network of the floor-bound conveyor system 36. It is clear that the AGV system can be replaced by any other suitable floor-bound conveyor type such as a roller conveyor, chain conveyor, belt conveyor, and the like.

Figure 3:
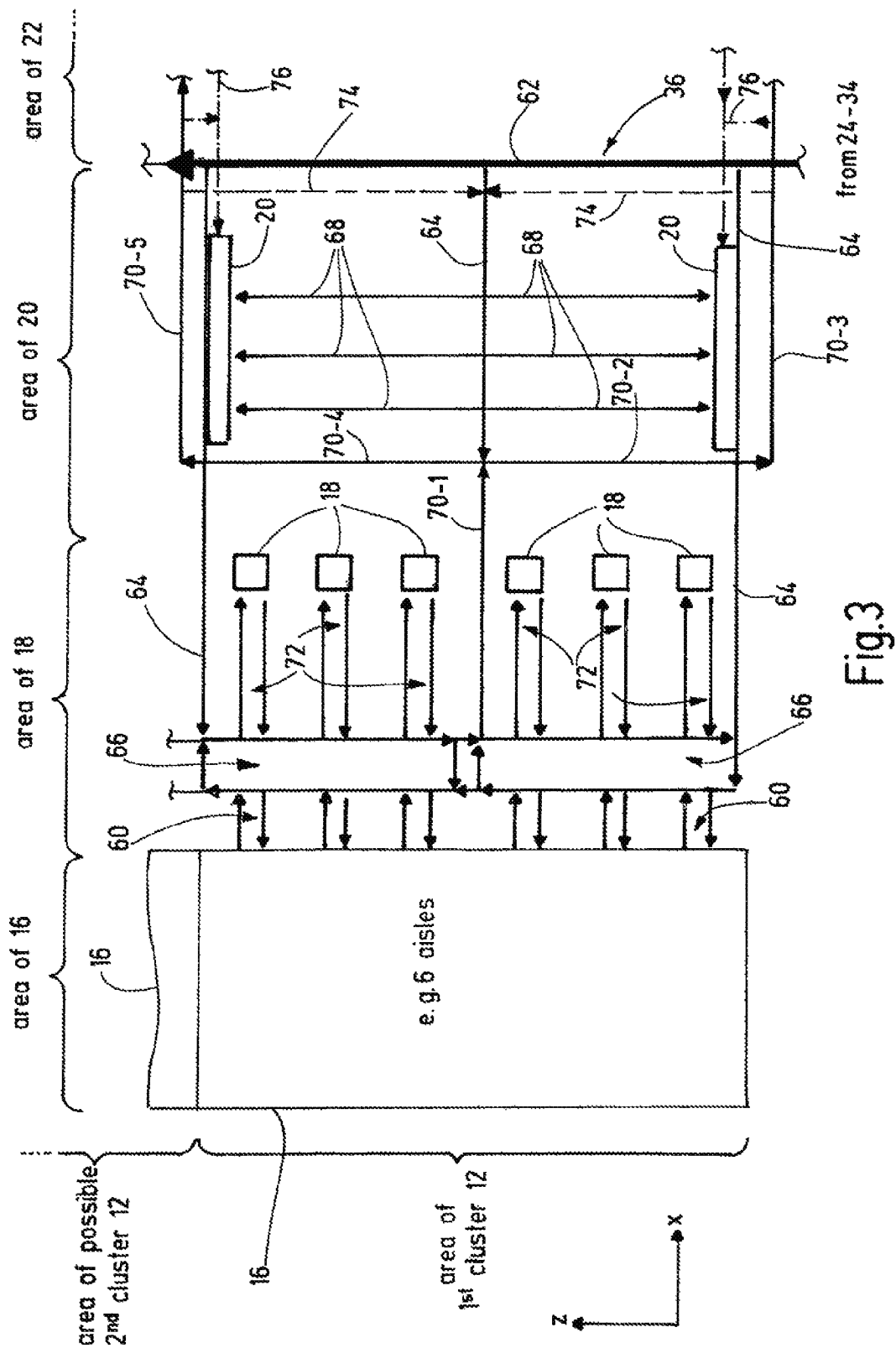
FIG. 3 shows an enlarged view of a part of the layout of FIG. 1.

FIG. 3 shows an enlarged view of a portion of the system of FIG. 1. The illustration of FIG. 3 focuses on the areas of the warehouse 16, the pick stations 18, and the decant stations 20 of FIG. 1. It is clear that these areas can overlap each other, although shown as being clearly separated in FIG. 3.

The warehouse 16 of FIG. 3 exemplarily comprises six rack aisles (not shown) respectively being sandwiched by two racks (not shown). Automated storage and retrieval devices (not shown) such as shuttles, cranes, and the like move within the aisles for storing and retrieving the totes 50 (not shown). Each of the aisles may be coupled to a pair of in-feed/out-feed conveyors 60, i.e. six pairs of in-feed/out-feed conveyors 60 are exemplarily provided. The in-feed/out-feed conveyors 60 may be part of the network of the floor-bound conveyor system 36.

The floor-bound conveyor system 36 is also shown only partially in FIG. 3. The floor-bound conveyor system 36 is supplied with (goods-receipt) articles 46 (not shown), for example, at the lower right corner of FIG. 3 representing an exemplary connection to at least one of the receiving area 24, the pallet warehouse 26, the full pallet receiving area 28, the palletizing/depalletizing station 30, the manual palletizing/depalletizing station 32, and the floor-loaded receiving station 34.

At this point the (goods-receipt) articles 46 may be introduced into the pick-and-pack cluster(s) 12 via a main conveyor 62. The main conveyor 62 may extend along the transversal direction Z, and may be coupled to one or more branch conveyors 64. The branch conveyors 64 may extend along the longitudinal direction X. In FIG. 3 three branch conveyors 64 are exemplarily shown. More or less branch conveyors 64 can be provided.

The upper and lower branch conveyors 64 of FIG. 3 connect the main conveyor 62 to one or more conveyor loops 66 in front of the warehouse 16 (pre-zone). In FIG. 3 two conveyor loops are exemplarily shown. It is clear that one or more conveyor loops 66 can be provided.

Each of the conveyor loops 66 shown in FIG. 3 is assigned, for example, to three of the aisles of the warehouse 16. This is expressed by corresponding connections to respectively three of the in-feed/out-feed conveyors 60. Each of the conveyor loops 66 is configured for distributing the totes 50 coming out of the warehouse 16 to the pick stations 18, or for distributing the totes 50 going into the warehouse 16, i.e. to the assigned aisles. The totes 50 (not shown) can be exchanged between the conveyor loops 66, which are connected to each other in a central region of FIG. 3, thereby changing the aisles or even the warehouses 16.

The central branch conveyor 64 of FIG. 3, for example, serves for feeding the totes 50 to the decant stations 20 via feeding conveyors 68. In FIG. 3 exemplarily two decant stations 20 and respectively three feeding conveyors 68 are shown. It is clear that one or more decant stations 20 can be provided for each of the pick-and-pack clusters 12. Also, it is clear that one or more feeding conveyors 68 can be provided for each of the decant stations 20.

The feeding conveyors 68 can be connected to any one of the branch conveyors 64, or even directly to the main conveyor 62. The feeding conveyors 68 shown in FIG. 3 extend exemplarily along the transversal direction Z.

The upper and lower branch conveyors 64 of FIG. 3, for example, serve for directly supplying the totes 50 to the warehouse 16 without decanting. This might occur in cases where the (goods-receipt) articles 46 are already received in the totes at the receiving area 24.

The decant stations 20 serve for decanting (goods-receipt) articles 46 from (goods-receipt) load supports 50, such as pallets, cartons, totes, tray, etc. (not shown), into the totes 50 which are used in the warehouse 16.

Further, a plurality of tote conveyors 70 is provided. FIG. 3 exemplarily shows five tote conveyors 70-1 to 70-5, which connect the warehouse(s) 16, via the in-feed/out-feed conveyors 60 and the conveyor loops 66, to the merge-and-pack stations 22 (not shown).

A first tote conveyor 70-1 is connected to at least one of the conveyor loops 66, and may extend along the longitudinal direction X. The first tote conveyor 70-1 may be arranged centrally between the conveyor loops 66 and the pick stations 18. The first tote conveyor 70-1 may branch into one or more conveying paths towards the merge-and-pack stations 22. In FIG. 3 two of these conveying paths are exemplarily shown. The first conveying path is formed by a second tote conveyor 70-2 and a third tote conveyor 70-3 extending in the lower part of FIG. 3. The second conveying path is formed by a fourth tote conveyor 70-4 and a fifth tote conveyor 70-5 extending in the upper part of FIG. 3.

The second tote conveyor 70-2 and the fourth tote conveyor 70-4 oppositely extend from the downstream end of the first tote conveyor 70-1 along the transversal direction Z. The third tote conveyor 70-3 and the fifth tote conveyor 70-5 respectively extend from the downstream ends of the second and fourth tote conveyors 70-2 and 70-4 along the longitudinal direction X.

The pick stations 18 of FIG. 3 may be connected to the conveyor loops 66 via further in-feed/out-feed conveyors 72. The further in-feed/out-feed conveyors 72 may extend along the longitudinal direction X.

In general, conveying directions of the respectively described conveyors are indicated by corresponding arrows in the figures.

FIG. 3 does not show the overhead conveyor system 38 being coupled to each of the picking stations 18, as shown in FIG. 2 in order to facilitate an understanding of the material/article flow, although being present.

Similar to FIG. 2, at each of the decant stations 20 shown in FIG. 3 a plurality of humans 44 (not shown) and/or robots (not shown) can work simultaneously, for instance three humans 44 at each of the decant stations 20

Optionally, one or more first connecting conveyors 74 can be provided. Each of the connecting conveyors 74 may connect one of the tote conveyors 70 to one of the branch conveyors 64 or feeding conveyors 68. In FIG. 3 the connecting conveyors 64 connect the third and fifth tote conveyors 70-3 and 70-5 to the central branch conveyor 64. The connecting conveyors 74 allow transport of the totes 50 from the warehouse 16 to the decant stations 20 for consolidation and "top off" purposes. During "top off" articles of the same type, coming from the receiving, are added to a tote of the warehouse 16. Buffer locations may be provided for synchronizing the tote with the articles form the receiving. The buffer locations may either be used by the receiving unit, which holds the articles, or by the totes 50 of the warehouse 16. The consolidation of the (warehouse) totes 50 results in a compaction of storage density in the warehouse 50.

The connecting conveyors 74 may also be used for so-called "single-piece order picks". A single-piece order pick is a special order comprising one order line (of one or more identical articles 46) only. Instead of loading the associated articles 46 first from one of the warehouse totes 50 into one or more of the pouches 48 and then unloading the correspondingly loaded pouches 48 at the merge-and-pack stations 22 (not shown), which will be explained in more detail below, the corresponding warehouse totes 50 can be transported directly to the merge-and-pack stations 22, thereby saving at least one transfer process, i.e. the pouch-unloading process.

Further, second connecting conveyors 76 may be provided. The second connecting conveyors 76 may serve for supplying empty totes 50 to the decant stations 20. In FIG. 3 exemplarily two second connecting conveyors 76 are shown. It is clear that one or more second connecting conveyors 76 can be provided. The second connecting conveyors 76 may connect the tote conveyors 70 to the decant stations 20.

Figure 4:
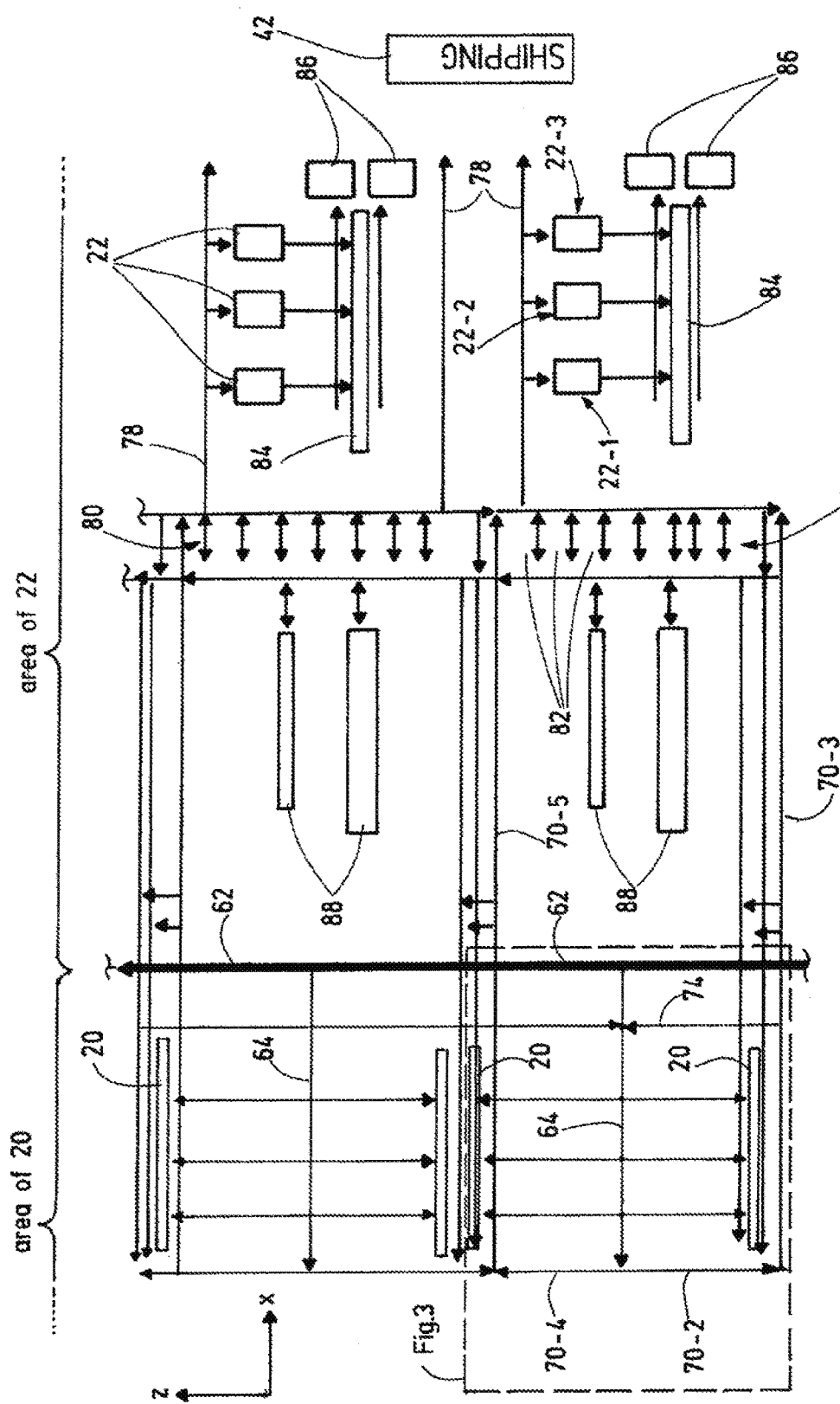
FIG. 4 shows an enlarged view of another part of the layout of FIG. 1.

FIG. 4 shows a continuation of the layout of the system 10 of FIG. 3. The layout of FIG. 3 is indicated by terms of broken line in the lower left corner of FIG. 4. In FIG. 4 merely some of the features of FIG. 3 are shown for facilitating an understanding of the overall concept.

FIG. 4 substantially shows the area of the merge-and-pack stations 22. In FIG. 4 six merge-and-pack stations 22 are exemplarily shown, wherein each cluster 12 exemplarily comprises three of the merge-and-pack stations 22. It is clear that one or more merge-and-pack stations 22 can be used (for one or more of the clusters 12).

The merge-and-pack stations 22-1 to 22-3 of a first cluster 12 (cf. FIG. 3) are connected to the floor-bound conveyor system 36 via a supply conveyor 78 exemplarily extending along the longitudinal direction X.

The supply conveyor 78 may be connected to the tote conveyors 70 via one or more sequencing devices 80. Alternatively, the supply conveyor 78 may be connected directly to the tote conveyors 70, thereby omitting the sequencing devices 80.

In FIG. 4 two sequencing devices 80 are exemplarily shown. Each of the sequencing devices 80 is configured to bring the totes 50, which hold non-pouchable articles 46 and arrive from the warehouse 16, into a desired sequence, or order (such as an absolute order, e.g. 1-2-3-4-. . . .-n) preset by a corresponding customer's order (and/or an associated packing pattern, as will be explained below). Each of the sequencing devices 80 may comprise one or more exchange conveyors 82, which may be operable bidirectionally and may be provided within a conveyor loop of the sequencing device 80.

Each of the merge-and-pack stations 22 is configured to unload pouchable and non-pouchable articles 46. For example, an automated unloading robot may be provided at each of the merge-and-pack stations 22. Alternatively, other devices (e.g., a manually operated unloading station) may be provided.

Please note that in FIGS. 3 and 4 the overhead conveyor system 38 is not shown (although present). In general, the overhead conveyor system 28 may comprise sorters such as matrix sorters for perfectly sequencing order batches, dynamic buffers such as batch buffers for the creation of order batches, unloading stations, and other overhead-coveyor components. A corresponding overhead conveyor system 38 is disclosed in the video "SSI Carrier: The highly-dynamic pouch sorter system for eCommerce and omni-channel distribution" retrievable from the Internet platform YouTube ("https://www.youtube.com/watch?v=g2J3KJnK_ok) which was uploaded on Mar. 7, 2018, and which is fully incorporated by reference hereby.

Each of the merge-and-pack stations 22 is connected to the pick station 18 via the overhead conveyor system 38 (not shown) for delivery of the pouches 48 loaded at the pick station(s) 18. Further, each of the merge-and-pack stations 22 is connected to the warehouse 16 via the floor-bound conveyor system 36 for delivery of the totes 50 which contain the non-pouchable articles 46 associated with a corresponding order.

With other words, each of the merge-and-pack stations 22 is configured to unload the articles 46 from the delivered totes 50 and from the loaded pouches 48 (as shown in the YouTube video), and to transfer the unloaded articles 46 in a packing sequence (defined by a packing pattern calculated by a packing algorithm in advance) to one or more shipping load supports (not shown) such as totes, boxes, cartons, pallets, trays, and the like.

Another exemplary (automated) pouch unloading station, which may be incorporated into the merge-and-pack station 22, is disclosed in WO 2014/044601 A1, which is fully incorporated by reference hereby.

FIG. 4 shows optional collecting areas 84 downstream to the merge-and-pack stations 22. Also, manual or automated packaging stations 86 can be optionally provided downstream. For example, the packaging stations 86 may include foil wrappers for wrapping a foil around a stack of the articles 46 (not shown). Alternatively, the stations 86 may be used for labelling, adding custom documents, and the like.

Moreover, the system 10 may comprise one or more empty-tote buffers 88, preferably configured for differently sized totes 50.

FIGS. 5 and 6 will be explained in common. FIG. 5 shows a block diagram of the (basic) cluster 12 formed by: the warehouse 16; the picking stations 18; the optional decant station 20; and the merge-and-pack station 22, which are arranged one behind the other in a preferred direction.

FIG. 6 expresses the scalability of the present concept. FIG. 6 shows a plurality of the clusters of FIG. 5 being arranged on top of each other, i.e. along a preferred second direction perpendicular to the first direction mentioned above in the context of FIG. 5.

The system layout of FIG. 6 can be extended upwards and/or to the left (cf. also FIG. 1). Each of the components 16, 18, 20, and 22 of the system 10 is autonomous. This means, for example, that each of the components 16-22 can supply itself.

Each of these components 16-22 is redundant in the overall system 10. For example, if the picking stations 18 of one of the clusters 12 are not operable, the picking stations 18 of one or more of the other clusters 12 can be used.

As another example, a specific article type might not be present in the warehouse 16 associated with the respective cluster 12. In this case, the required article type might be provided from a different one of the warehouses 16.

Figure 7:
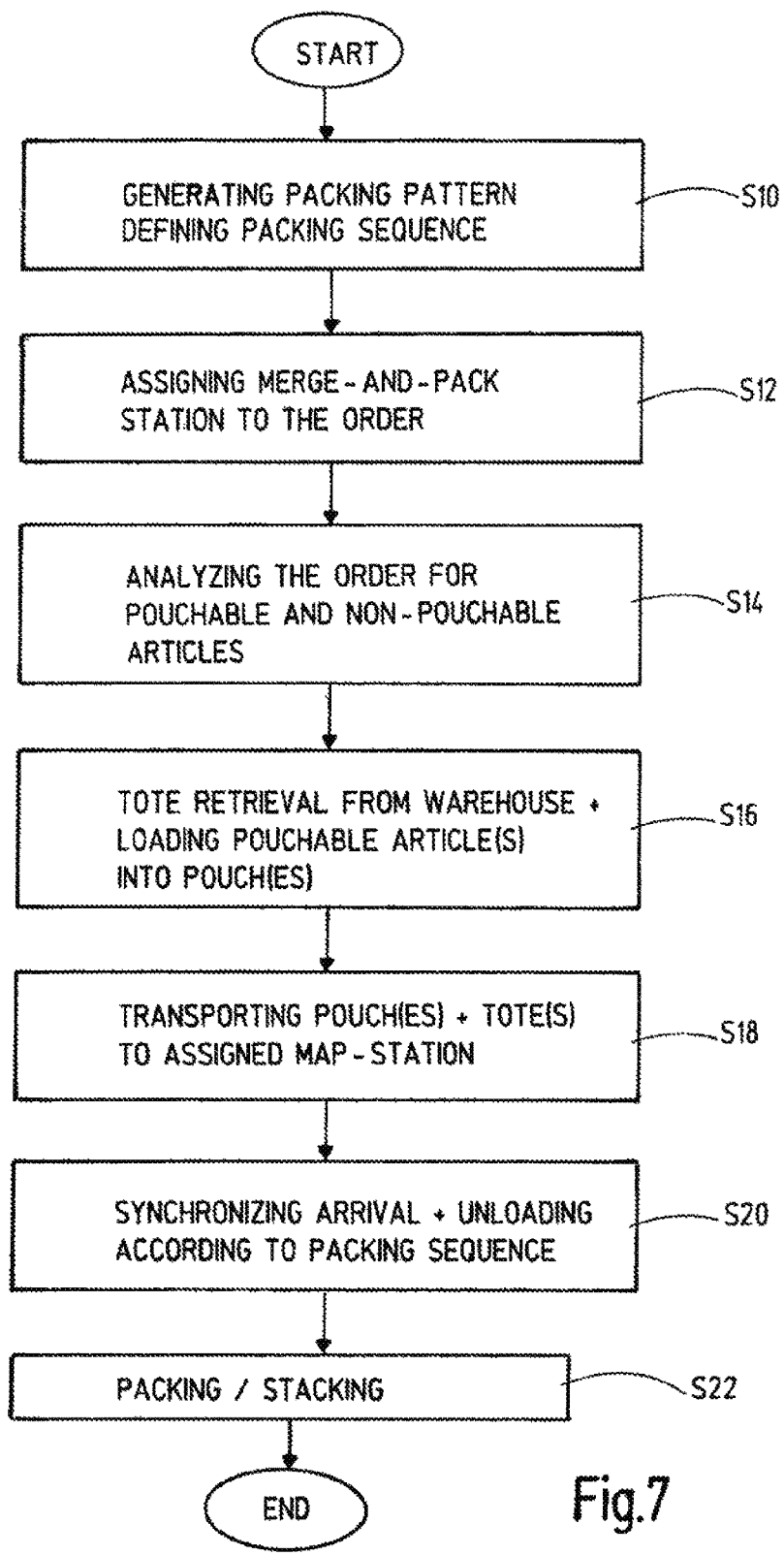
FIG. 7 shows a flow chart of a method for operating the system of FIG. 1.

FIG. 7 shows a flow chart for visualizing several processes carried out in the system 10 for order fulfillment, in particular for fulfillment of E-commerce orders. For facilitating an understanding of the processes, the processing of one single order will be described. This basic concept can be extended to a huge number of orders, as will be explained below.

In a first step S10 a packing pattern for one specific order is generated by a packing algorithm (may be part of the control unit 14), thereby defining a packing sequence. The packing pattern defines a geometrical arrangement of the articles associated with the order within a to-be-formed article stack. Normally, heavy articles are positioned in a lower portion of the stack, wherein lighter articles are positioned in an upper section in order not to damage the lighter articles. This packing pattern defines the packing sequence in which the articles of the associated order need to be provided at the merge-and-pack station 22 for forming the article stack. In the example above, the heavier articles need to be provided first, i.e. before the lighter articles are provided. Therefore, the packing pattern determines the packing sequence.

In step S12 one of the merge-and-pack stations (in the following also called "MAP" stations) 22 is assigned to the associated order. The assigned MAP station 22 represents a point within the system 10 where each of the articles 46 associated with the order need to meet at the same time of forming the article stack, i.e. for packing, even if the articles 46 originate from different aisles within one and the same warehouse 16 and/or from different warehouses 16 of different clusters 12. The assigned MAP station 22 defines the (transport) distances of the articles 46 associated with the order.

In step S14 the order, i.e. the article types (order lines) thereof, is analyzed with regard to pouchable and non-pouchable articles 46 (i.e. article types) associated with the order. The pouchable articles 46 are sized such that they fit into the pouches 48. The non-pouchable articles 46 do not fit into the pouches 48, because the non-pouchable articles 46 are one either too big or too heavy.

In step S16 the corresponding totes 50, which hold the pouchable and non-pouchable articles 46 and which result from the analysis of the step S14, are retrieved from the warehouse(s) 16. The pouchable articles 46 are transported in the associated totes 50 to one or more of the picking stations 18 which are associated with the assigned MAP station 22. At the one or more picking stations 18 the pouchable articles 46 associated with the order are loaded into a corresponding number of the pouches 48. Preferably, only one piece of the pouchable articles 46 is put into each of the pouches 48.

Dependent on whether or not the picking stations 18 are automated, the control unit 14 (cf. FIG. 1) issues corresponding instructions either to the human 44 or to a robot. Then the control unit 14 causes transport of the correspondingly loaded pouches 48 from the pick stations 18 to the assigned MAP station 22 (cf. step S18), which may include a sorting process.

At the same time, the control unit 14 causes transports of the corresponding totes 50, which hold the non-pouchable articles 46, to the assigned MAP station 22 (cf. step S18).

In step S20 arrivals of the loaded pouches 48 and the totes 50 holding the non-pouchable articles 46 are synchronized at the assigned MAP station 22. This synchronization is determined by the packing sequence of the step S10.

This means, in the view of the example given above, that the heavy and/or larger articles 46 arrive first, and then the lighter and/or smaller articles 46 are provided (independent of whether or not these articles 46 are pouchable or non-pouchable).

Step S20 further includes unloading the pouchable and non-pouchable articles 46 in accordance with the packing sequence.

In step S22 the unloaded articles 46 are packed in the packing sequence, i.e. the articles 46 may be stacked according to the packing pattern (cf. step S10).

The synchronization step S20 may include (conveying) path optimization processes.

LIST OF REFERENCE NUMERALS 10 system
12 pick-and-pack cluster
14 control unit
16 (tote) warehouse
18 pick station
20 decant station
22 merge-and-pack station
24 receiving area
26 pallet warehouse
28 full pallet receiving area
30 palletizing/depalletizing station
32 manual palletizing/depalletizing station
34 floor-loaded receiving system 36 floor-bound conveyor system
38 overhead conveyor system
40 extension area
42 shipping area
44 human
46 article
48 pouch
50 storage unit (e.g., a tote)
52 (computer) screen
54 rails of 38
56 AGV, automated guided vehicle
58 guiding line
60 infeed/outfeed conveyors
62 main conveyor
64 branch conveyor
66 conveyor loop
68 feeding conveyors
70 storage unit conveyors
72 infeed/outfeed conveyors
74 first connecting conveyors
76 second connecting conveyors
78 supply conveyor
80 sequencing device
82 exchange conveyor
84 collecting area
86 packaging stations
88 empty storage unit buffer Therefore, what we claim is:

1. An article-handling system for order fulfillment comprising:
one or more pick-and-pack clusters;
an overhead conveyor system, which includes a network of overhead conveyors, for conveying pouches;
a floor-bound conveyor system, which includes a network of floor-bound conveyors, for conveying storage units holding articles; and
a control unit;
wherein each of the one or more pick-and-pack clusters comprises the following modules:
an automated warehouse comprising a plurality of racks and aisles therebetween, wherein the racks are configured for storage and retrieval of storage units by an automated storage and retrieval device;
a plurality of pick stations connected to the warehouse via the floor-bound conveyor system for delivering the storage units from the warehouse, wherein each of the pick stations is configured for loading the articles, in accordance with an article type and number defined by an order, from the storage units into the pouches; and
one or more merge-and-pack stations connected to the pick stations via the overhead conveyor system for delivery of loaded pouches, and connected to the warehouse via the floor-bound conveyor system for delivery of the storage units, wherein each of the merge-and-pack stations is configured to unload articles from the delivered storage units and the loaded pouches, and to transfer the unloaded articles in a packing sequence to one or more shipping units;
wherein the control unit is configured to perform the following steps:
generating a packing pattern for the order defining the packing sequence;
assigning one of the one or more merge-and-pack stations to the order;
analyzing the order with regard to pouchable and non-pouchable articles associated with the order, wherein each of the pouchable articles is sized and heavy such that it fits into one of the pouches, and wherein each of the non-pouchable articles is at least one of sized and heavy such that it does not fit into one of the pouches;
causing: i.) retrieval of corresponding storage units, which contain the pouchable articles associated with the order, from the warehouse, ii.) delivery of the retrieved storage units to one or more of the pick stations, and iii.) loading the pouchable articles from the delivered storage units into one or more of the pouches at the one or more pick stations;
causing transport of loaded pouches from the one or more pick stations to the assigned merge-and-pack station;
causing transport of corresponding storage units, which contain the non-pouchable articles associated with the order, to the assigned merge-and-pack station; and
synchronizing arrivals of the loaded pouches and the corresponding storage units, which contain the non-pouchable articles associated with the order, and unloading the pouchable and non-pouchable articles associated with the order at the assigned merge-and-pack station so that the pouchable and non-pouchable articles associated with the order are transferable in the packing sequence to one or more shipping units associated with the order and the packing pattern.

2. The system of claim 1, wherein each of the one or more pick-and-pack clusters further comprises the following module:
one or more decant stations connected to the warehouse via the floor-bound conveyor system, wherein each of the decant stations is configured for decanting the articles into the storage units of the warehouse.

3. The system of claim 2, wherein each of the decant stations is further configured for compacting storage units holding articles of an identical same article type, which storage units are stored in the warehouse and are not completely loaded with the articles of the identical articles type.

4. The system of claim 2, wherein the modules of each of the pick-and-pack clusters are respectively arranged, in a layout view, along a first imaginary line in an order of: the warehouse, the pick stations, decant stations, if present, and the merge-and-pack stations.

5. The system of claim 4, wherein identical modules of different ones of the pick-and-pack clusters are arranged directly adjacent to each other along a second imaginary line perpendicular to the first imaginary line.

6. The system of claim 1, wherein the step of synchronizing arrivals includes selecting a conveying path for the non-pouchable articles associated with the order from the warehouse to the assigned merge-and-pack station, and adjusting the transport of the pouchable articles associated with the order temporally.

7. The system of claim 6, wherein one of a warehouse-storage location of the non-pouchable articles associated with the order and the assigned merge-and-pack station is selected first.

8. The system of claim 1, wherein the control unit is further configured to:
analyze the order with regard to non-totable articles, wherein each of the non-totable articles is at least one of sized and heavy such that it does not fit into one of the storage units and the pouches;
cause transport of the non-totable articles associated with the order to the assigned merge-and-pack station; and
synchronize arrivals of the pouchable, non-pouchable, and non-totable articles at the assigned merge-and-pack station according to the packing sequence.

9. The system of claim 1, wherein the overhead conveyor system further comprises a sorter arranged downstream to the pick stations and upstream to the assigned merge-and-pack station.

10. The system of claim 1, wherein the floor-bound conveyor system is free of buffers between the warehouse and the assigned merge-and-pack station.

11. The system of claim 1 further being configured to handle more than one million of different article types, 90% of which are slow movers.

12. The system of claim 1, wherein the pouchable articles are respectively defined by a maximum size of 600×500×200 mm³.

13. The system of claim 12, wherein the pouchable articles respectively have a maximum weight of 8 kg.

14. The system of claim 1, wherein the control unit is further configured to perform batch-picking so that the pouchable articles associated with a plurality of orders are loaded in an article-orientated manner at the pick stations.

15. The system of claim 14, wherein the non-pouchable articles associated with the plurality of orders are transported from warehouses of clusters different to the cluster of the assigned merge-and-pack station.

16. A method for operating an article-handling system for order fulfillment, the system comprising: one or more pick-and-pack clusters; an overhead conveyor system, which includes a network of overhead conveyors, for conveying pouches; a floor-bound conveyor system, which includes a network of floor-bound conveyors, for conveying storage units holding articles; and a control unit; wherein each of the one or more pick-and-pack clusters comprises the following modules: an automated warehouse comprising a plurality of racks and aisles therebetween, wherein the racks are configured for storage and retrieval of storage units by an automated storage and retrieval device; a plurality of pick stations connected to the warehouse via the floor-bound conveyor system for delivering the storage units from the warehouse, wherein each of the pick stations is configured for loading the articles, in accordance with an article type and number set by an order, from the storage units into the pouches; and one or more merge-and-pack stations connected to the pick stations via the overhead conveyor system for delivery of loaded pouches, and connected to the warehouse via the floor-bound conveyor system for delivery of the storage units, wherein each of the merge-and-pack stations is configured to unload articles from the delivered storage units and the loaded pouches, and to transfer the unloaded articles in a packing sequence to one or more shipping units; the method comprising the following steps:

generating a packing pattern for the order defining the packing sequence;

assigning one of the one or more merge-and-pack stations to the order;

analyzing the order with regard to pouchable and non-pouchable articles associated with the order, wherein each of the pouchable articles is sized and heavy such that it fits into one of the pouches, and wherein each of the non-pouchable articles is at least one of sized and heavy such that it does not fit into one of the pouches;

retrieving corresponding storage units, which contain the pouchable articles associated with the order, from the warehouse, delivering the retrieved storage units to one or more of the pick stations, and loading the pouchable articles from the delivered storage units into one or more of the pouches at the one or more pick stations;

transporting loaded pouches from the one or more pick stations to the assigned merge-and-pack station;

transporting corresponding storage units, which contain the non-pouchable articles associated with the order, to the assigned merge-and-pack station; and synchronizing arrivals of the loaded pouches and the corresponding storage units, which contain the non-pouchable articles associated with the order, and unloading the pouchable and non-pouchable articles associated with the order at the assigned merge-and-pack station so that the pouchable and non-pouchable articles associated with the order are transferable in the packing sequence to one or more shipping units associated with the order and the packing pattern.

* * * * *